Figures 4, 5:
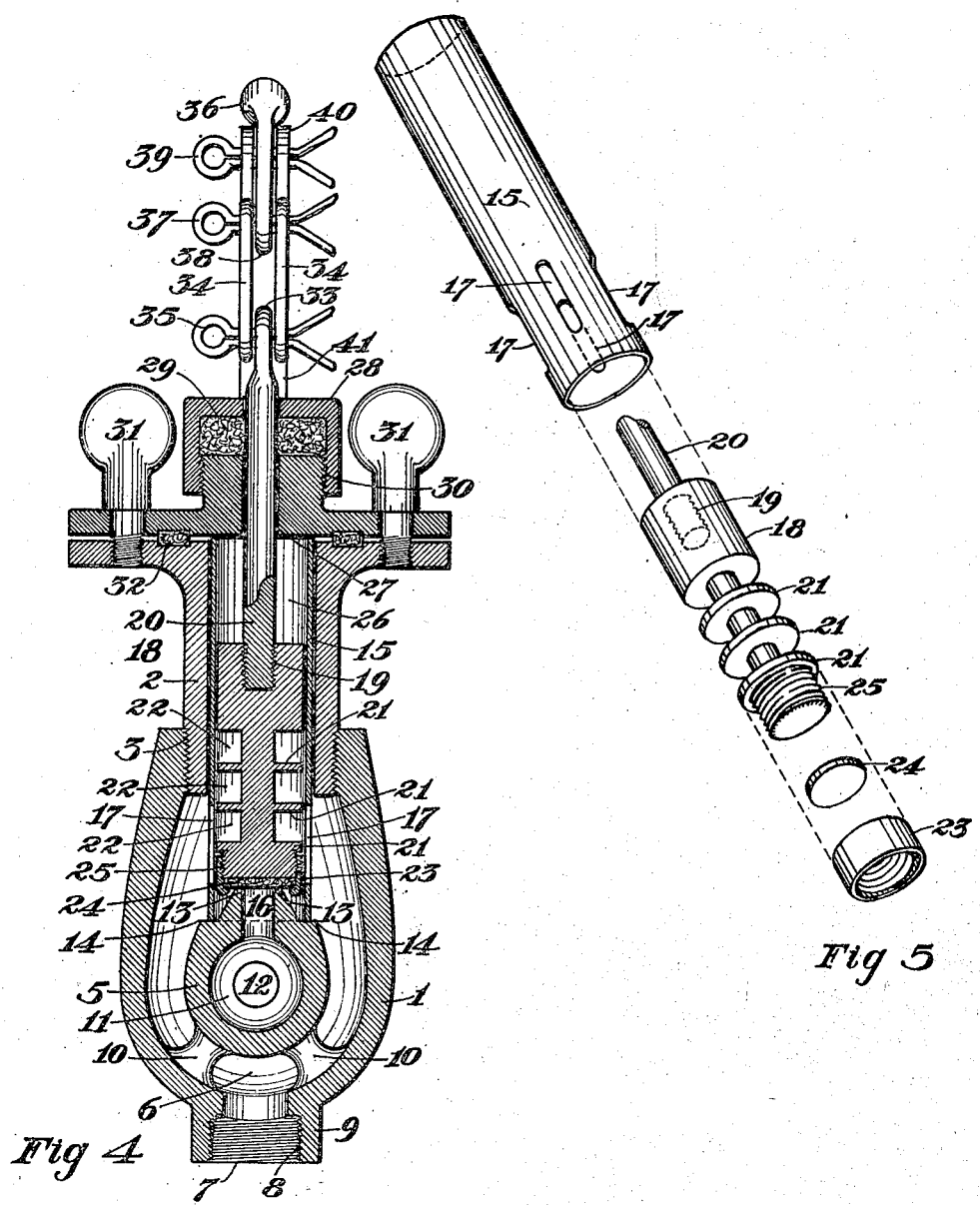

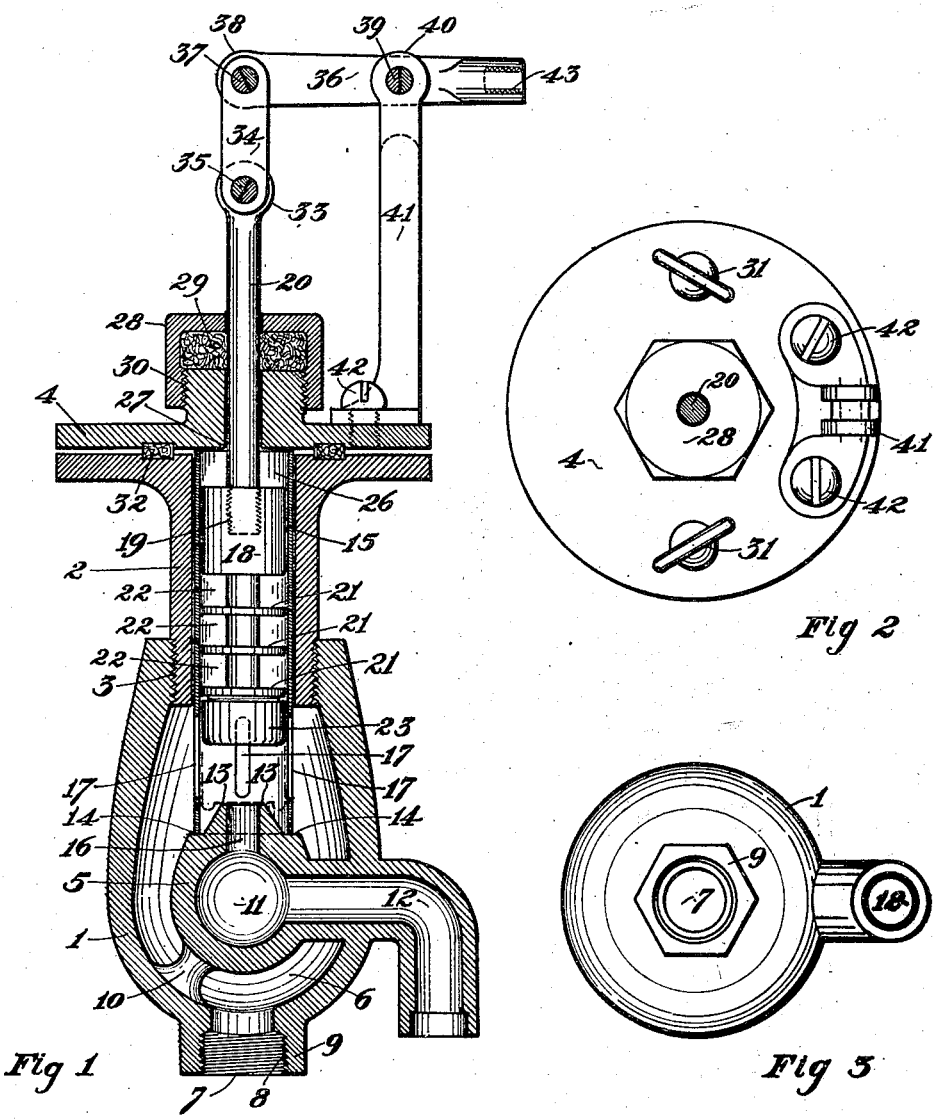

Oct. 21, 1924.

H. E. DARROW 1,512,329

PRESSURE EQUALIZING VALVE

Filed March 1, 1921     2 Sheets-Sheet 2

Patented Oct. 21, 1924.

1,512,329

UNITED STATES PATENT OFFICE.

HENRY EDGAR DARROW, OF SANTA BARBARA, CALIFORNIA.

PRESSURE-EQUALIZING VALVE.

Application filed March 1, 1921. Serial No. 448,920.

*To all whom it may concern:*

Be it known that I, HENRY EDGAR DARROW, a citizen of the United States, residing at the city of Santa Barbara, county of Santa Barbara, State of California, have invented a new and useful Pressure-Equalizing Valve, of which the following is a specification.

My invention relates to an improvement in valves in which a sliding piston containing annular fluid chambers operates upon the usual valve seat, and within and in conjunction with a cylindrical casing having inlet ports, which introduce the flow of fluid through such inlet ports and into such fluid chambers with pressure. The objects of my improvement are, first, to provide a valve with a sliding piston and annular fluid chambers whereby the pressure of any fluid, like water, steam, air, gas etc. entering through the said ports and above the valve seat, is equalized; and, second, to utilize such fluid pressure in cooperation with the opening and closing of the valve.

I attain these objects by the mechanism illustrated in the accompanying drawings, in which—

Figure 1 is a vertical section of valve in open position, with main outlet and standard to the right; Figure 2 is a top view of valve structure; Figure 3 is the bottom view of valve casing; Figure 4 is a vertical section of valve in closed position, showing thumb screws, with standard and main outlet to the rear of the valve; and Figure 5 is an isometrical view of cylindrical casing and valve piston in detail arrangement.

Similar numerals refer to similar parts throughout the several views.

The lower casing 1 joined with the upper casing 2 by threads 3, and a top plate 4 form the general outside walls and structure of the valve. Between the lower casing 1 and the outlet casing 5, there is formed the main inlet chamber 6 for the reception of fluid entering therein through the main inlet 7, having threads 8 and flattened faces 9 to connect the valve with the main fluid supply. The outlet casing 5 is joined with the lower casing 1 by two solid supports 10 for stability.

The outlet casing 5 contains the main outlet chamber 11 communicating with the outlet pipe 12 for the ultimate discharge of the fluid after leaving the valve. To the upper side of the outlet casing 5 is constructed an ordinary valve seat 13 with an annular shoulder 14 to support the cylindrical casing 15, which is set in vertically upon said annular shoulder 14 over the valve seat opening 16, and securely incased by the walls of the upper casing 2 and the top plate 4. At the lower end of said cylindrical casing 15 are four inlet ports 17 arranged equally distant apart, for the introduction of fluid from the main inlet chamber 6 into said casing. The piston, referred to herein, comprises the piston base 18, having threads 19 for connection to a piston stem 20, the flanges 21, forming the piston fluid chambers 22, and the cap 23 encompassing a disk 24 and threaded to the piston head 25; all of such units are for convenience herein referred to collectively as the piston. The piston incased in the cylindrical casing 15 and fitted to move up or down, is adjusted to permit the piston head 25 and the nearest adjacent fluid chamber 22 to traverse the inlet ports 17. To accomplish this movement a chamber 26 is provided above the piston base 18 in the upper end of the cylindrical casing.

The piston stem 20 extends through an opening 27 in the top plate 4 and the stuffing box 28, which contains packing 29 around the piston stem to prevent leakage. Said packing box 28 is secured to the top plate 4 by threads 30. The top plate 4 is securely attached to the upper casing 2 by thumb screws 31 with an ordinary gasket 32 inserted to prevent leakage. In the upper end of the piston stem 20 is an eye 33, to which is connected one end of the links 34, by cotter pin 35. To the other end of these links 34 is connected a lever arm 36 by means of a cotter pin 37 passing through an eye 38 in the end of the lever arm 36. The lever arm 36 rotates on an axis formed by another cotter pin 39 passing through eyes 40 on the end of a standard 41 vertically erected on the top plate 4 and attached thereto by screws 42 set in said top plate.

To the free end of this lever arm 36, by means of threads 43 may be attached the usual float stem-and-float for the purpose of raising or lowering the valve piston, but the piston may also be operated by any of the usual mechanisms, like worm gear appliances, push-and-pull handles, etc., such attachments and the one described herein forming no part of my invention. The upper casing 2, lower casing 1, the position of the main inlet 7 and outlet 12, and the general structure containing the valve mechanism may be changed and altered to meet the needs of the various mechanisms to which my invention may be adapted, such features forming no part of my invention.

The cylinder 15 and the piston are so constructed that there is a slight annular clearing space between them permitting the fluid from the main inlet chamber 6 to pass between said piston and the cylinder 15 to the rear piston chamber 26, and vice versa.

When the valve is closed, that is to say, when the disk 24 is resting on the valve seat 13, the fluid in the rear piston chamber 26 being in communication with the fluid in main inlet chamber 6, will exert a pressure on the piston tending to keep the valve closed on its seat. The fluid in the annular piston chambers 22 will exert pressure equally in all directions and will not affect the movement of the piston in one way or the other.

On raising the piston from the valve seat 13, the fluid will rush to the outlet port 16 and break the hydrostatic connection between the fluid in inlet chamber 6 and rear piston chamber 26. Furthermore, it will create a suction analogous to an injector action and tend to draw the fluid from the annular piston chambers 22 and the rear piston chamber 26 to the outlet port. The result of this action will gently force the piston upwardly.

On the downward movement of the piston toward its seat 13, the downward movement of the piston will be retarded for the reason that the vacuum which the downward movement of the piston tends to form in the rear piston chamber 26, is filled with fluid passing between the cylinder 15 and the piston. Since the clearance space between the piston and the cylinder is slight, it takes an appreciable length of time for the fluid to pass to the rear piston chamber 26. The annular piston chambers 22 appear to cause cross currents in the upward or downward passage of the fluid to or from the rear piston chamber 26.

It will thus be seen that the construction of my valve will cause the valve to move uniformly to and from its seat avoiding any quick and jerky movements thereof.

I claim:

1. In combination, in a valve, a valve casing having an annular valve seat and a shoulder surrounding the seat, a cylindrical casing encased in the walls of the valve casing above the inlet port of the casing and supported by said shoulder, a valve piston having a stem, one or more annular chambers in said valve piston, there being a slight clearance space between said valve piston and said cylindrical casing, and a top plate with an opening therein for passage and movement of the stem of the valve piston, substantially as set forth.

2. In combination in a valve, a valve casing having an inlet and an outlet port, a valve seat at the outlet port, and a shoulder surrounding the valve seat, a cylindrical casing having an open port adjacent the valve seat supported by said shoulder, a valve piston in said cylindrical casing having a plurality of chambers above said valve seat, a removable disc packing at the lower end of said valve, a packing retaining ring attachably secured to said valve piston, there being a slight clearance space between said valve piston and said cylindrical casing a valve piston stem, a top closure for said cylindrical casing with an opening in said closure for passage and movement of said piston valve stem, substantially as set forth.

3. In combination in a valve, a valve casing having an inlet port and an outlet port, a valve seat at the outlet port, a cylindrical casing having an open port adjacent the valve seat, a valve piston in said cylindrical casing, a removable disc packing at the lower end of said valve piston, a packing retaining ring attachably secured to said valve piston, there being a slight clearance space between said valve piston and said cylindrical casing a valve piston stem, a top closure for said cylindrical casing with an opening in said closure for passage and movement of said piston valve stem and means for axially reciprocating said piston valve stem without rotating said stem.

4. In combination in a valve, a valve casing having an inlet port and an outlet port, a valve seat at the outlet port, a cylindrical casing having an open port adjacent the valve seat, a valve piston in said cylindrical casing having one or more chambers above said valve seat, a removable disc packing at the lower end of said piston, packing retaining means attachably secured to said piston, there being a slight clearance space between said valve piston and said cylindrical casing a valve piston stem, a top closure for said cylindrical casing with an opening in said closure for passage and movement of said piston valve stem, and means for axially reciprocating said piston valve stem without rotating said stem.

5. In combination in a valve, a valve casing having an inlet port and an outlet port, a valve seat at the outlet port, a cylindrical casing having an open port adjacent the valve seat, a valve piston in said cylindrical casing having a plurality of chambers above said valve seat, a disc packing at the lower end of said piston, means for removably securing said packing to the piston, there being a slight clearance space between said valve piston and said cylindrical casing, a closure for said cylindrical casing, and reciprocating means for operating said valve piston.

HENRY EDGAR DARROW.

Witnesses:
L. L. POPE,
E. R. LEWIS.